United States Patent

[11] 3,597,064

| [72] | Inventor | Guy C. Caraway<br>Downey, Calif. |
|---|---|---|
| [21] | Appl. No. | 1,184 |
| [22] | Filed | Jan. 7, 1970 |
| [45] | Patented | Aug. 3, 1971 |
| [73] | Assignee | Technicolor, Inc.<br>Hollywood, Calif. |

[54] FOCUSING ASSEMBLY FOR PROJECTORS
10 Claims, 4 Drawing Figs.

[52] U.S. Cl............................................. 352/140,
350/255, 353/101
[51] Int. Cl.......................................... G03b 3/00
[50] Field of Search........................... 352/140;
353/69, 101; 350/41, 46, 74, 76, 78, 77, 79, 255

[56] References Cited
UNITED STATES PATENTS
3,445,155  5/1969  Sturrock.................. 350/255

*Primary Examiner*—S. Clement Swisher
*Attorney*—Lyon and Lyon

ABSTRACT: A focusing assembly for a projector, such as a cartridge loaded projector. The focusing assembly includes a cam device having one end coupled with a lens assembly and has a cam surface on the other end thereof. A shaft which is operated by a knob frictionally engages the cam surface. Rotation of the shaft pivots the cam which in turn causes the lens assembly to move back and forth along the longitudinal axis of the lens. The center point of the radius of the cam surface is offset from the longitudinal axis of the cam. This arrangement requires a substantial degree of rotation of the shaft to obtain full travel of the lens assembly and action in turn enables finer adjustment of focusing.

INVENTOR
GUY C. CARAWAY
BY
Lyon & Lyon
ATTORNEYS

FOCUSING ASSEMBLY FOR PROJECTORS

This invention relates to a focusing assembly for a lens and more particularly to a novel focusing assembly for operating the lens of a motion picture projector.

As is known to those in the art, various types of focusing arrangements for lenses have been provided in the past. One arrangement includes a lens barrel having a helical groove therein with the lens barrel being mounted within a cylindrical body such that rotation of the barrel causes the lens to move back and forth. Other arrangements involve the use of a rack and pinion type construction for moving the lens back and forth. Exemplary patents illustrating lens focusing arrangements are U.S. Pat. Nos. 270,133, 1,620,768 and 2,493,463.

The present focusing assembly is characterized by several advantages over those of the prior art. First, it provides a gearless eccentric type movement which enables smooth action throughout the full focusing range. It accommodates overtravel of rotation of the focusing control without damage to the assembly. The assembly includes a cam which is pivoted by a shaft engaging a cam surface of the cam. The radius of the cam surface is offset from the longitudinal axis of the cam and the longitudinal axis of the lens assembly thereby requiring a greater rotation of the shaft to give full travel of the focusing assembly.

Accordingly, it is a principal object of this invention to provide an improved focusing assembly for a lens.

An additional object of this invention is to provide a relatively simple friction type focusing assembly for a lens.

A further object of this invention is to provide a novel focusing assembly for the lens of a motion picture projector.

These and other objects and features of the present invention will become better understood through a consideration of the following description taken in conjunction with the drawings in which.

Figure 1:
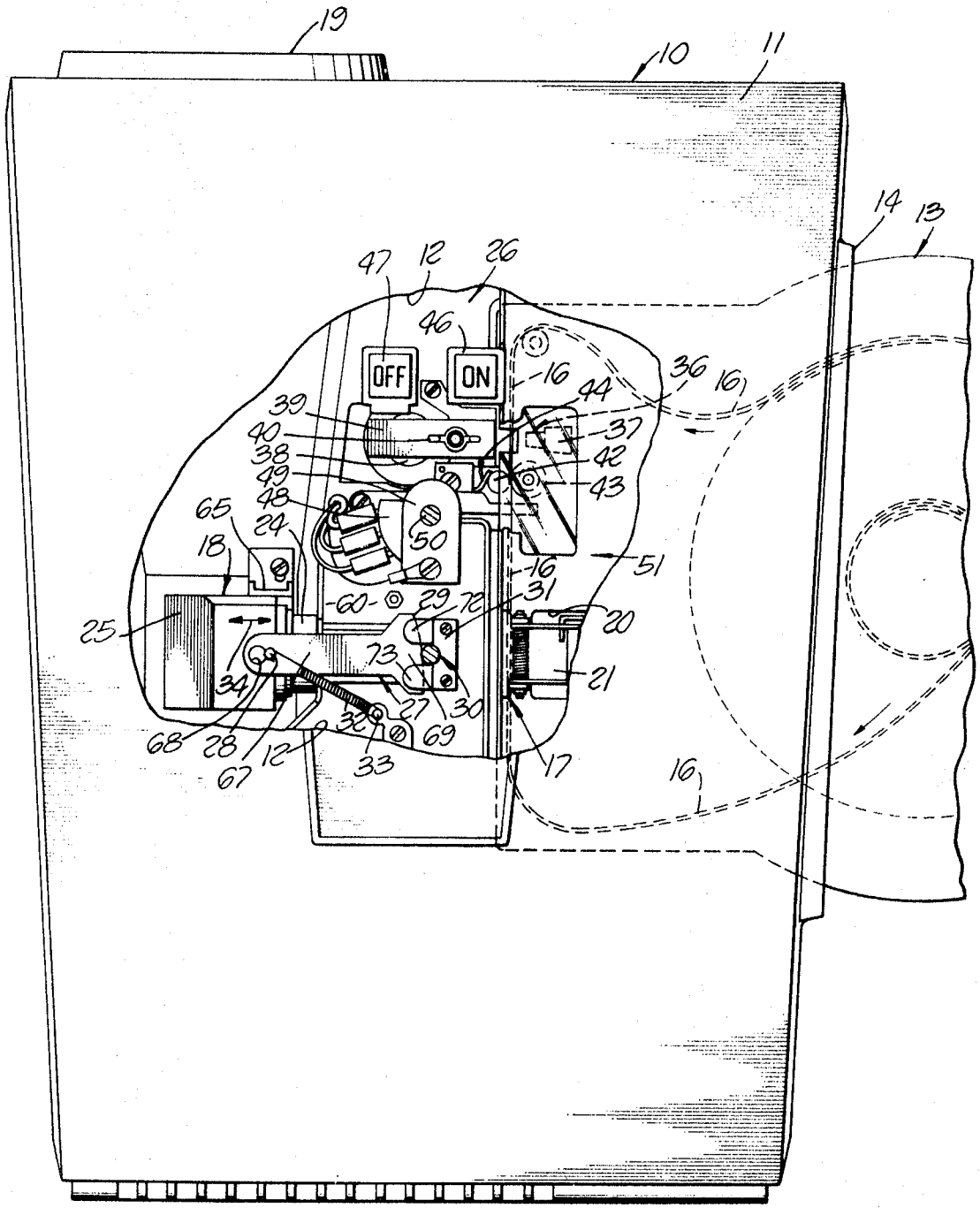
FIG. 1 is a plan view, partially broken away, of a motion picture projector employing the focusing assembly of the present invention.

Turning now to the drawings, a projector 10 is illustrated in FIG. 1 and includes a housing 11 which is broken away at 12 in order to illustrate certain internal components of the projector. The projector illustrated may be of the nature of the Model 1,000 projector manufactured and sold by Technicolor, Inc. of Hollywood, California. The exemplary projector illustrated in a cartridge loaded projector including a cartridge 13 which is inserted within an aperture in the side 14 of the projector. The cartridge typically is of the construction illustrated in copending U.S. application Ser. No. 825,504, entitled "Motion Picture Film Cartridge," filed May 19, 1969 in the name of Edward Robak, and assigned to the assignee of the present application, the disclosure of which is incorporated herein by reference.

The cartridge includes a plastic enclosure within which is disposed an endless loop of conventional motion picture film having both picture frames and an optical sound track. A loop of film as designated by dashed lines 16 in FIG. 1 extends from the roll of film in the cartridge and passes through a film gate 17 for projection through an optical system, such as a lens-prism assembly 18, out through an opening 19 at the front of the projector 10. A projection light source (not shown) is mounted within the projector and disposed beneath the cartridge. Light from the source is projected upwardly through an aperture 20 and reflected by a pivotal reflector assembly through the film and film gate 17 to the lens-prism assembly 18. The light is reflected toward the film by the underside surface of a reflector 21 of the reflector assembly. The film gate 17 includes two metal plates for appropriately guiding the film, and these plates have aligned apertures through which each frame of the film is projected. One of these plates is a stationary member and is affixed within the projector, and the other of these plates is spring loaded and comprises a part of the film cartridge 13 as more fully described in said copending application. This particular assembly comprises no part of the present invention.

The film is advanced through the projector by means of a reciprocating claw (not shown) which engages perforations within the film in a conventional manner. Each frame of the film is projected through the lenses of a lens barrel 24 to a prism assembly 25 which in turn serves to reflect the images for projection out through the opening 19 at the front of the projector 10. The various internal components of the projector are mounted on a chassis 26.

A focusing assembly of the present invention includes a focus control cam 27 pivotally connected by a pin 28 to the lens-prism assembly 18. The cam has a cam surface 29 which is frictionally engaged by a focus control shaft 30 which extends upwardly from the projector and may have a knob (not shown) disposed thereon. The focus control shaft is held in place by a focus shaft clamp 31 which is secured to the chassis 26. A spring 32 is coupled between the pin 28 and a pin 33 affixed to the chassis 26. Rotation of the shaft 30 causes pivoting of the cam 27 about the pin 28 and thereby causes the lens-prism assembly 18 to move back and forth as indicated by an arrow 34.

As the film 16 continues its movement it arrives at an optical sound pickup assembly 36 which includes an optical sound pickup transducer 37 which responds to the film density modulations of the sound track and provides an electrical output which is amplified and applied to a loudspeaker (not shown) mounted at the front of the projector. A lamp 38 projects light through a condenser lens and through the optical sound track to the transducer 37. The lamp 38 is retained in position by means of a bracket 39 and wing nut 40. The film is driven through the optical sound pickup assembly 36 by means of a metal capstand 42 which is driven at a constant speed by an electric motor, and a pressure, or pinch roller 43. A capstand scraper 44 is mounted to engage the periphery of the capstand 42, for effecting cleaning of the capstand and film. The optical pickup assembly and the capstand scraper assembly are more fully described and illustrated in copending application Ser. No. 1,183 filed Jan. 7, 1970 (Lyon & Lyon Docket 129/96), entitled "Capstand Scraper," filed in the name of Edward Robak, and assigned to the assignee of the present application, the disclosure of which is incorporated herein by reference.

Suitable control buttons 46 and 47 are provided for turning on and off the motor and electronic circuitry of the projector. A volume control 48 is mounted beneath a bracket 49, and has a shaft 50 which extends upwardly from the projector for varying the volume of the sound for the projected film. An upper cartridge guide plate 51 is secured to the chassis 26 and serves as an upper guide for insertion of the cartridge 13. The body of the chassis serves as the lower guide for the cartridge.

Figure 2:
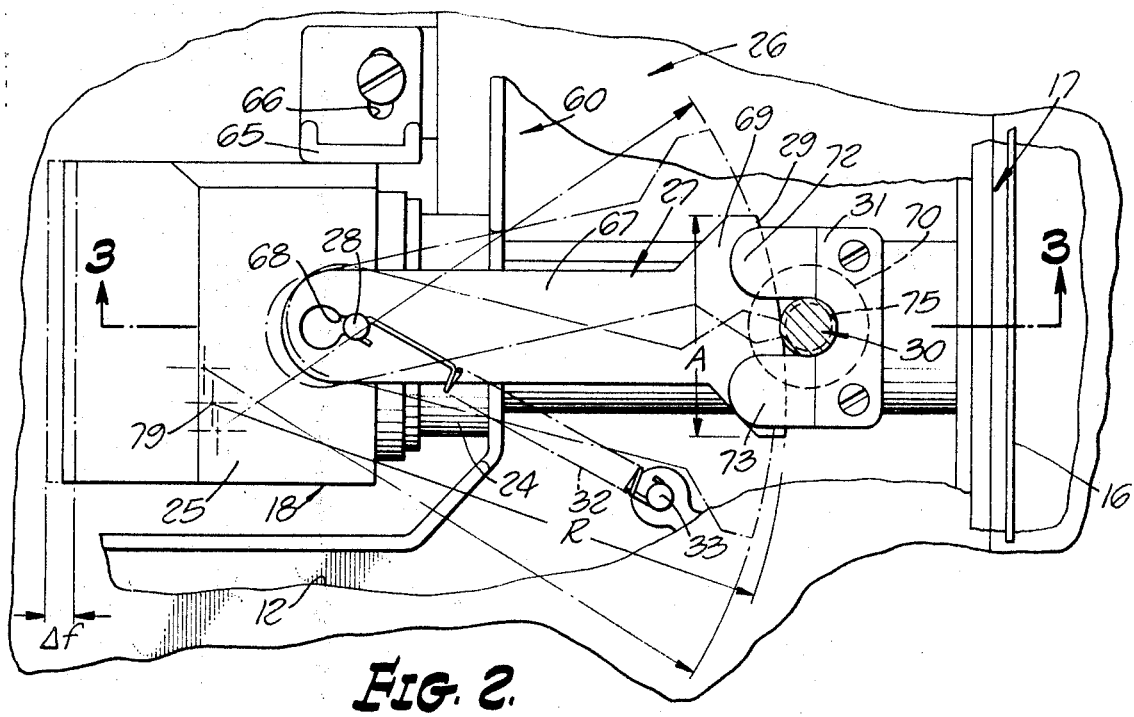
FIG. 2 is a detailed plan view of the focusing assembly.
Figure 3:
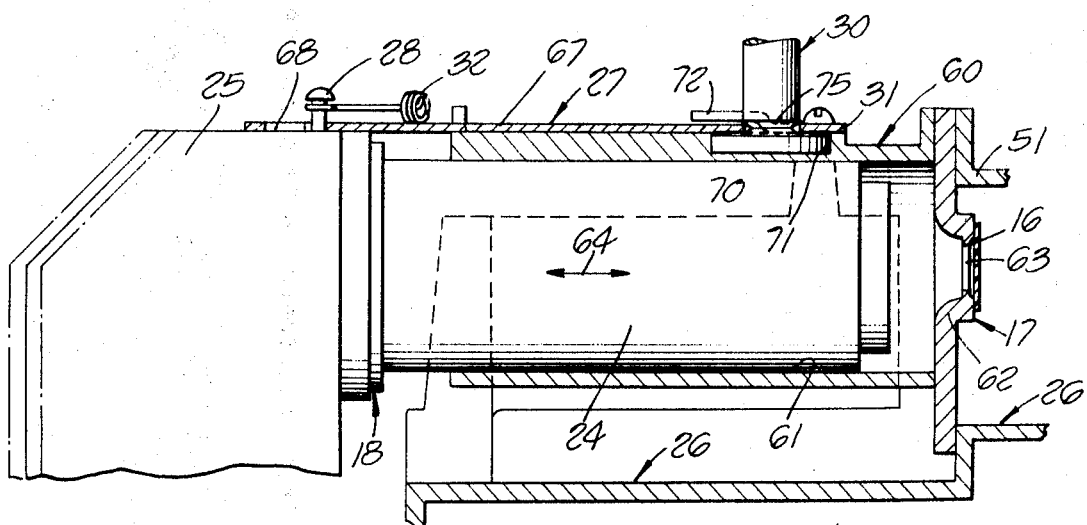
FIG. 3 is a cross-sectional elevational view of the assembly illustrated in FIG. 2.
Figure 4:
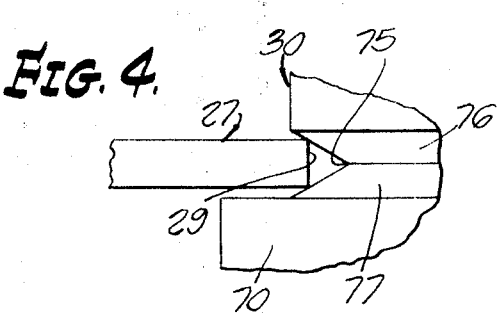
FIG. 4 is a fragmentary view illustrating the manner in which a control shaft engages the cam surface of the focusing assembly.

Considering the focusing assembly of the present invention in more detail, reference is now made to FIGS. 2 through 4. A lens assembly body plate 60 is secured to the chassis 26 and includes a cylindrical opening 61 as best seen in FIG. 3 which serves as a guide for the cylindrical lens barrel 24. A fixed aperture plate 62 of the film gate 17 is affixed to the body 60. The plate 62 has an aperture 63 therein through which each frame of the film 16 is projected by the light source into the lens barrel 24 as was discussed earlier.

The lens barrel 24 contains conventional lenses for directing the images from the film to the prism assembly 25. The prism assembly serves to deflect the images for projection out through the opening 19 at the front of the projector 10, also as noted earlier. The lens barrel 24 and prism assembly 25 are fixed together and, thus, reciprocate in the cylindrical opening 61 as indicated by an arrow 64 in FIG. 3. A guide bracket 65 is secured to the chassis 26 and bears against the lower forward edge of the prism assembly 25 to keep the prism assembly 25 and barrel 24 from rotating within the cylindrical opening 61. The spring 32 serves to rotationally bias the prism assembly 25 into contact with the guide 65, and to bias the lens-prism assembly 24-25 to the right as viewed in FIGS. 2 and 3. With this biasing or spring loading arrangement, the lens-prism assembly is maintained in proper alignment by the spring 32 and guide 65. The bracket 65 has an elongated opening 66 which allows the same to be properly adjusted so that the lens-prism assembly stays in proper alignment. The spring 32 also maintains the cam surface 29 in frictional engagement with the shaft 30.

Turning now to the cam 27 and shaft 30, the cam is in the form of an arm 67 having an aperture 68 in one end thereof which is mounted on and in engagement with the pin 28. The aperture is large enough to allow the cam 27 to be readily mounted on the pin 28, but has a smaller portion which remains loosely secured under the head of the pin 28 when the cam is biased against the shaft 30 by the spring 32. The other end of the arm flares outwardly to provide a cam portion 69 having the cam surface 29 at the extreme outer edge thereof. The cam 27 preferably is stamped from cold rolled steel.

The lower end of the shaft 30 has a circular flange 70 loosely mounted within a cylindrical opening 71 in the body 60. The clamp 31 retains the flange 70 within the opening 71. The clamp has offset fingers 72 and 73 which extend around the periphery of the shaft 30 and serve as an upper stop for the cam portion 69 of the cam 27. The spring 32 serves to bias the lens-prism assembly to the right as noted earlier and therefore maintains the cam surface 29 in contact with the shaft 30 and the cam portion 69 thereof beneath the fingers 72 and 73. The shaft 30 has a groove 75 in the form of a V as best seen in FIG. 4. The cam surface 29 frictionally engages the upper and lower walls 76 and 77 of the groove 75 as illustrated in FIG. 4. The shaft 30 preferably is formed of cold finished steel with a cadmium plating thereon. The walls 76 and 77 may diverge at an angle of 60° to provide a groove opening of 0.042 inch. This is suitable for a cam 27 having a thickness of 0.036 inch. The shaft 30 may have an external diameter of one-fourth inch, and the flange 70 may have a diameter of approximately 0.56 inch. The offset of the fingers 72 and 73 may be 0.05 inch high to provide clearance for the cam portion 69 without undue friction thereon.

Turning now to the cam surface 29, it will be noted that the same is not symmetrical about the pivot pin 28 which is affixed to the prism assembly 25. The radius R of the cam surface 29 has its center offset from the longitudinal axis of the cam 27 and from the longitudinal axis of the lens barrel 27 as seen in FIG. 2. A suitable radius R is 2.656 inches, and dimension A may be 0.992 inch. The center of the radius R of the cam 27 in the full-lined position shown in FIG. 2 is at a point 79, and this point shifts as illustrated depending upon the position of the cam.

The essentially eccentric type cam surface requires that the shaft 30 be rotated through a greater angle to achieve full back and forth stroking of the lens-prism assembly. Conventional arrangements employing a crank pin drive provide full focus travel in approximately 180° rotation of the shaft; whereas, the present arrangement provides full travel in approximately 270° rotation of the shaft 30. This permits finer focusing to be achieved. Additionally, the spring biasing arrangement of the lens-prism assembly and, thus, the cam 27, maintains the cam surface 29 in sufficient frictional engagement with the walls of the groove 75 of the shaft 30. This eliminates the need for any gearing arrangement and also allows overtravel rotation of the shaft 30 without damage to the focusing assembly. Although a lens-prism optical assembly is illustrated in combination with the focusing cam and shaft, it will be apparent that the present focusing assembly also is useful with a lens without a prism assembly.

The present embodiment of this invention is to be considered in all respects as illustrative and not restrictive.

What I claim is:

1. A focusing assembly for an optical system having a stationary support member and a lens assembly reciprocally mounted in combination with said support member, comprising control shaft means rotatably coupled with said support member, said control shaft means having a relatively smooth peripheral circular portion and being rotatable for effecting reciprocal movement of said lens assembly, cam means having a first end pivotally coupled with said lens assembly and having a second end forming a cam surface having a predetermined radius, said cam means having a longitudinal axis and said predetermined radius having a center offset from said longitudinal axis, and resilient means for biasing said cam surface in frictional engagement with said circular portion of said shaft means.

2. A focusing assembly as in claim 1 wherein said circular portion of said shaft means includes a peripheral groove having at least a wall, and said resilient means biases said cam surface in engagement with said wall.

3. A focusing assembly as in claim 2 including
clamp means secured to said support means for facilitating maintenance of said engagement of said cam surface with said groove.

4. A focusing assembly as in claim 1 wherein
said first end of said cam means is pivotally coupled with said lens assembly by a pin, and
said resilient means comprises a spring having one end coupled at said pin and another end coupled to said support means.

5. A focusing assembly as in claim 4 wherein
said circular portion of said shaft means includes a peripheral groove having at least a wall, and said resilient means biases said cam surface in engagement with said wall.

6. A focusing assembly as in claim 5 wherein
said groove is a V-shaped groove having diverging walls and the edges of said cam surface engage said walls.

7. A focusing assembly as in claim 1 wherein
said lens assembly comprises at least a lens element and image deflecting means for reorienting images projected by said lens assembly, said deflecting means having a housing, and
guide means coupled with said support means for bearing against said housing, said guide means in combination with said resilient means maintaining said lens assembly in predetermined alignment with respect to said support means.

8. A focusing assembly for an optical system having a stationary support member and a lens assembly reciprocally mounted in combination with said support member, comprising control shaft means rotatably coupled with said support member, said control shaft means having a relatively smooth peripheral groove and said shaft means being rotatable for effecting reciprocal movement of said lens assembly, cam means having a first end pivotally coupled at a predetermined location on said cam means with said lens assembly and having a second end forming a relatively smooth cam surface, said cam surface being eccentric with respect to said predetermined location on said first end of said cam means, and resilient means coupled at said predetermined location and with said support means for biasing said cam surface in frictional engagement with said groove of said shaft means.

9. A focusing assembly as in claim 8 wherein
said first end of said cam means is pivotally coupled at said predetermined location with said lens assembly by a pin, and
said resilient means comprises a spring having one end coupled to said pin and another end coupled to said support means.

10. A focusing assembly as in claim 8 wherein said lens assembly comprises at least a lens element and image deflecting means for reorienting images projected by said lens assembly, said deflecting means having a housing, and guide means coupled with said support means for bearing against said housing, said guide means in combination with said resilient means maintaining said lens assembly in predetermined alignment with respect to said support means.